United States Patent [19]
Kuts

[11] 3,919,904
[45] Nov. 18, 1975

[54] TIRE TRUING MACHINE
[75] Inventor: Mathew Kuts, Akron, Ohio
[73] Assignee: The B. F. Goodrich Company, Akron, Ohio
[22] Filed: Jan. 18, 1974
[21] Appl. No.: 434,500

Related U.S. Application Data
[63] Continuation of Ser. No. 237,369, April 5, 1972, abandoned.

[52] U.S. Cl. .................. 82/47; 82/100; 82/101; 82/1 C; 157/13
[51] Int. Cl.² .................. B23B 1/00; B23B 5/14
[58] Field of Search ............ 157/13; 82/46, 47, 101, 82/100, 1 C

[56] References Cited
UNITED STATES PATENTS
2,023,575  12/1935  Connelly .............................. 157/13
2,925,125  2/1960  Curry .................................... 157/13
3,435,640  4/1969  Flekac ............................. 83/820 X
3,584,673  6/1971  Lehman ............................... 157/13

FOREIGN PATENTS OR APPLICATIONS
461,526  1/1951  Italy ..................................... 157/13

Primary Examiner—Leonidas Vlachos
Attorney, Agent, or Firm—J. Januszkiewicz; W. A. Shira, Jr.

[57] ABSTRACT

A tire truing machine that has a continuously orbiting band saw moving across a tool guide that has an arcuately shaped recess that positions the cutting edge of the band saw adjacent to the tread of a pneumatic tire. The tire is chucked and rotated as the band saw operates on the tread surface or portions thereof.

12 Claims, 4 Drawing Figures

TIRE TRUING MACHINE

This is a continuation, of application Ser. No. 237,369, filed Apr. 5, 1972 now abandoned.

BACKGROUND OF THE INVENTION

This invention relates to a tire truing machine and more particularly to a new and improved tire truing machine which employs a band saw as the cutter.

In the manufacture of tires and through the use thereof, it is not infrequent that small degrees of out-of-roundness occurs which cause vibration, uneven wear, and poor roadability. Even in the case of perfectly symmetrical balanced tires and where a vehicle is out of alignment, the tires are worn unevenly causing tire unbalance and further uneven wear. The high speeds at which vehicles now travel due to the continuing increase of interstate highways, it is extremely important to have tires that are uniform in their radial dimension.

Several types of tire truing machines are employed. One such machine employs a trimming knife that is moved transversely across the face of a tire while others employ grinding wheels or an abrading tire rasp to remove material therefrom. In the case of grinding wheels, one problem encountered is that the material removed is not uniform due to the tread design, wherein the grinding wheel removes chucks of rubber tire tread at the edges of the tire elements or blocks. Such elements or blocks being of various configurations including rectangular, diamond, square, or triangular shaped. Machines employing trimming knives must be traversed across the face of a tire slowly to assure a smooth cut, which is time consuming.

Another problem that has existed is nonuniformity of tires other than out-of-roundness. In this respect a tire may be perfectly round in the sense of its radial distance from the center being the same entirely around the circumference of a tire; however, due to imperfections in the building of a tire and general processing of a tire, a tire may be nonuniform in radial force variations. A load wheel is moved into contact with a tire and as the tire is rotated, a sensing device measures the radial force variations. The imperfections measured arise when building a tire as where plies of bias cut fabric are cut to length and built up into a cylindrical shape with overlapping edges on a tire building drum. Such overlapping presents a greater buildup of material than at other locations. Succeeding plies are wrapped around the drum with the side edge portions of the plies turned down over the sides of the drum. Certain of the side portions of the plies are turned over preformed bead wires while others are turned down and over the bead wires. Such flat cylindrical portions tend to pucker and may result in uneven buildup of material leading to variations in response to the radial force measuring device. Calendered and extruded strips of rubber which form the overhead are then wrapped around the tire carcass. Such lengths may cause uneven buildup of material due to uneven tensioning of the material as it is being applied to the tire carcass. It is then desirable to be able to remove material from the completed and cured tire in such a manner to help the variations in nonuniformity as measured by the nonuniformity machine as described in such U.S. Pat. Nos. as 3,534,598 and 3,552,200. In such removal of material, it is essential to provide means which can accurately feather the amount being removed and to so remove the material as to not affect radial run-out.

SUMMARY OF THE INVENTION

The present invention contemplates an apparatus and method for truing pneumatic tires wherein a continuously moving band saw is guided for a small portion of its orbit over an arcuately recessed guide member which has the profile of the crown of a tire or similar to it, such that as a tire is rotated the continuously moving band saw trims or skives the circumferential tread to a uniform radial dimension that is consistent in its lateral dimensions as well.

It is an object of this invention to true tires in a uniform accurate manner providing consistent dimensions. A further object is to provide a circumferentially consistent tire whose radius is predetermined and the same throughout. Another object of this invention is to provide a trimming cut that accurately removes minute portions of the tire and is able to feather such cuts to assure a smooth transition from the trimmed portion to the untrimmed portion where a minimum cut is required or where desired. It is important that such trimmed cut be accurate and not be noticeable in the finished tire such as to detract from its appearance.

DETAILED DESCRIPTION

Figure 1:
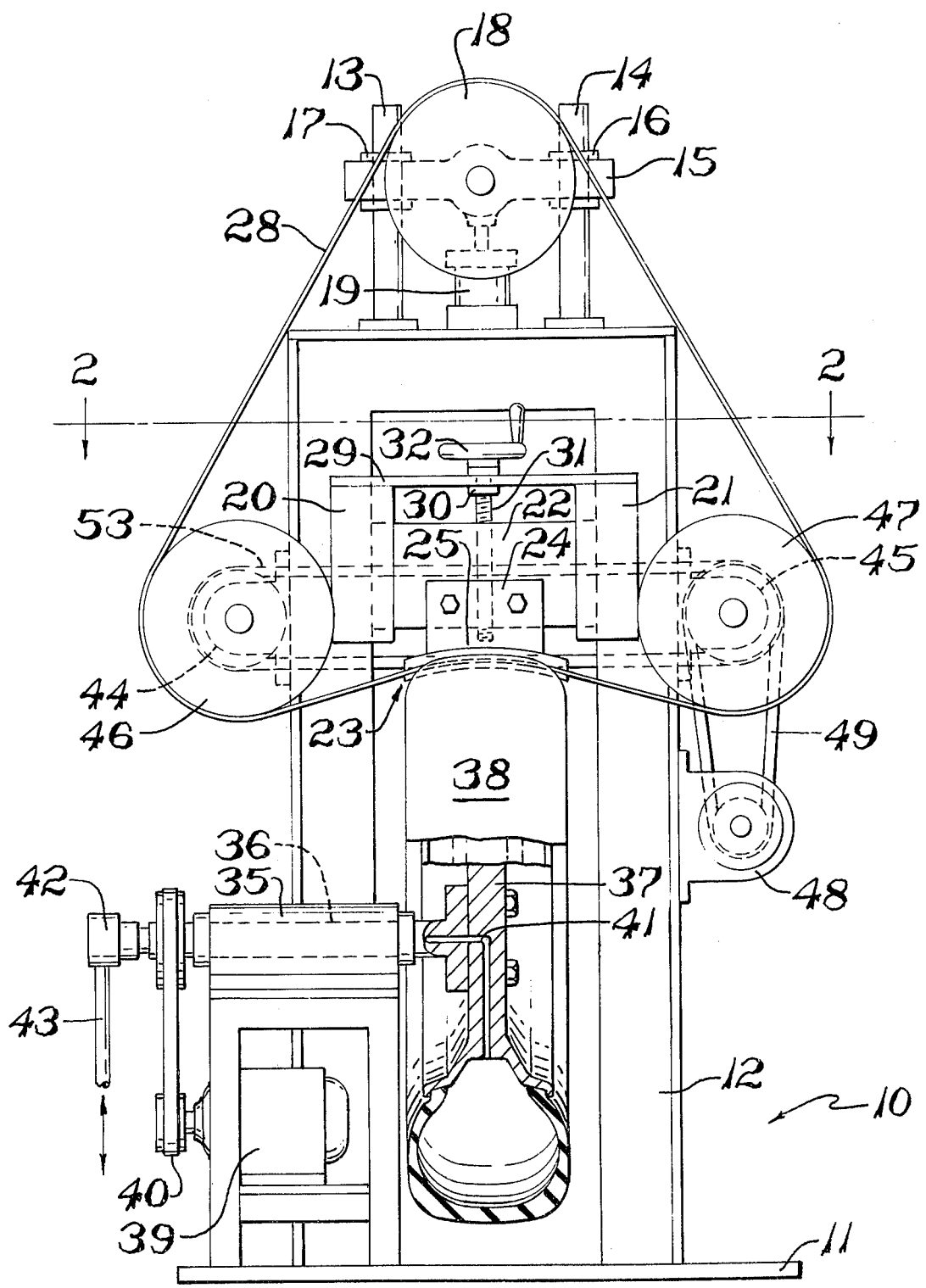
FIG. 1 is a front elevational view of a tire truing machine with a portion of the tire in cross section.
Figure 2:
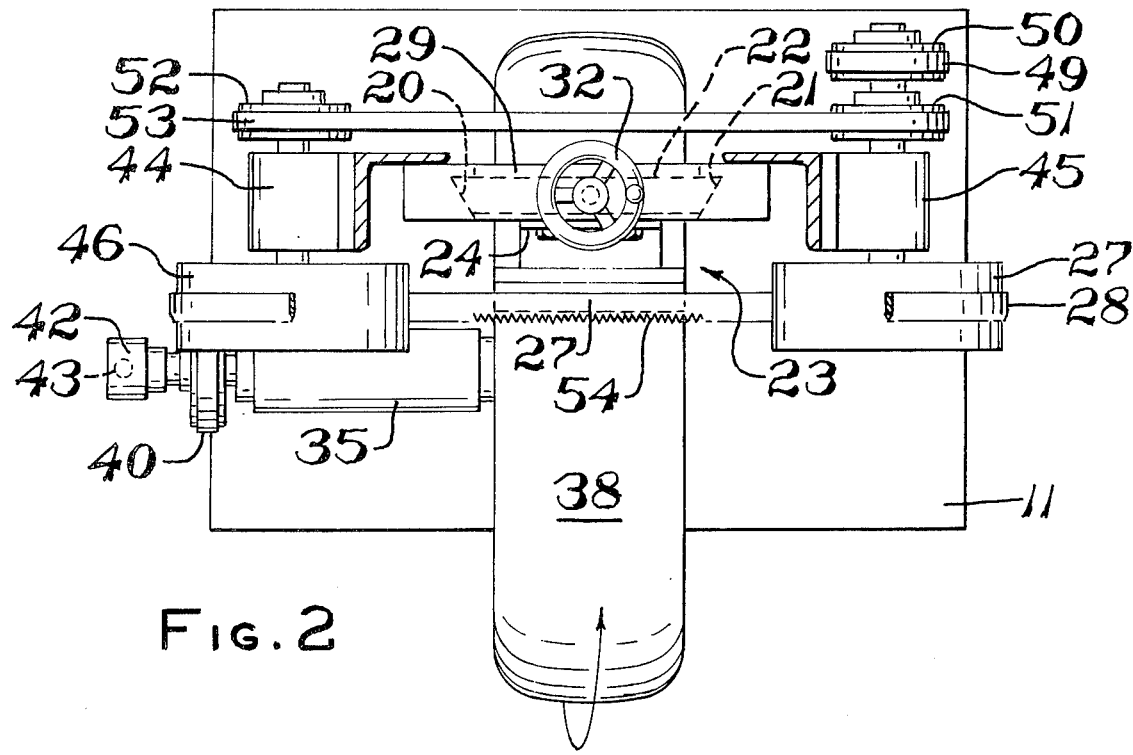
FIG. 2 is a fragmentary plan view of tire truing apparatus taken along lines 2—2 of FIG. 1.
Figure 3:
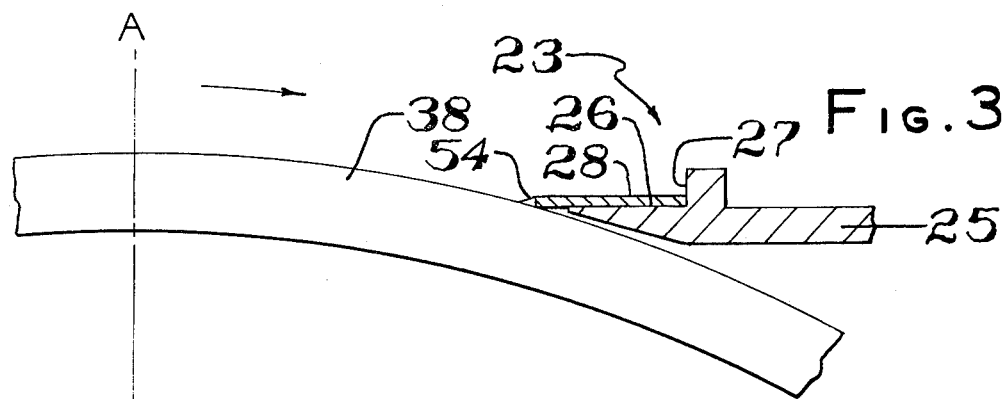
FIG. 3 is a side cross-sectional view of the tire tread and the band saw with the tool guide.
Figure 4:
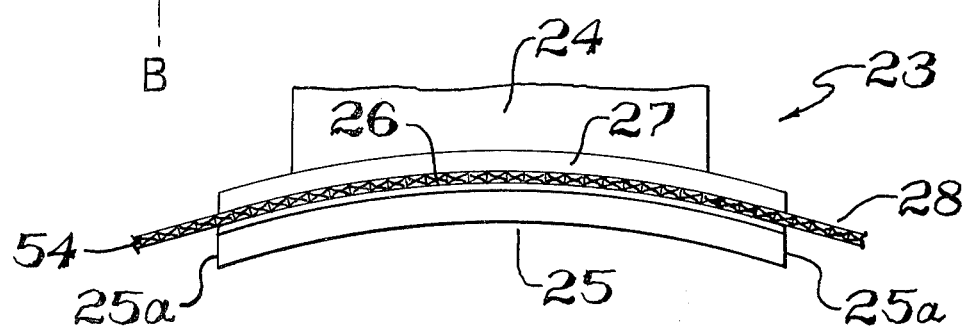
FIG. 4 is an enlarged front elevational view of the band saw and tool guide.

With reference to the accompanying drawings wherein like reference numerals designate similar parts throughout the various views, there is shown in FIG. 1 a support means 10 which includes a base 11 and a U-shaped member 12. Mounted on the upper portion of the U-shaped member 12 is a pair of vertically extending guide rods 13 and 14. Mounted for movement on the guide rods 13 and 14 is a yoke 15 having bushings 16 and 17. Mounted for rotation on the yoke 15 is a pulley 18. A pneumatic cylinder 19 is mounted on U-shaped member 12 with its piston rod connected to yoke 15 for biasing such yoke member and pulley 18 upwardly for a purpose to be described. As shown in FIGS. 1 and 2 the U-shaped member 12 has a pair of guideways 20 and 21 suitably recessed to receive a tool support means 23 (FIG. 4). Tool support means 23 includes a slide member 22 (FIG. 1) that is suitably recessed to be received by the respective guideways 20 and 21, and a vertical plate member 24 suitably secured to slide member 22. Tool support means 23 includes an arcuately shaped member 25 that is secured to vertical plate member 24 with such plate member being recessed to provide an arcuately shaped flat surface 26 (FIG. 3) and a back guide edge 27, which surface and edge supports the movement of a band saw 28 over such tool support means. Suitably secured to the upper end portion of U-shaped member 12 is a cross plate 29 which supports the bushing 30 in which is journaled for rotation of threaded lead screw 31. Lead screw 31 is threadedly connected to slide member 22 such that a handle 32 connected to the lead screw 31 provides for the vertical adjustment of the tool support means 23 relative to a pneumatic tire that is to be trimmed. Mounted on one of the vertically extending legs of U-shaped member 12 is a tire support means or a chucking means which includes a housing 35 which supports for rotation a shaft 36. The one end of shaft 36 has secured thereto a quick dismount tire flange 37, which flange 37 supports for rotation therewith a tire 38.

Suitably mounted upon support means 10 is a variable speed motor 39 which has its output shaft operatively connected via belt 40 to drive shaft 36 and tire 38. Shaft 36 has a passageway 41 extending longitudinally therethrough which connects to a passageway in tire flange 37 which, in turn, communicates with the tire 38. The passageway 41 is connected by a rotary union 42 and conduit 43 to a suitable pressure source by which tire 38 is inflated. Located respectively on the intermediate outer end portions of U-shaped member 12 are journals 44 and 45 which rotatably support pulleys 46 and 47, respectively. A variable speed motor 48 is mounted on the one leg portion of U-shaped member 12 and has its output shaft connected via a belt 49 to a pulley 50 which is keyed to the shaft that rotates pulley 47. Mounted and keyed to the shaft that supports pulleys 47 and 50 is a pulley 51, while keyed to the shaft that supports pulley 46 is a pulley 52 (FIG. 2). A belt 53 trained about pulleys 51 and 52 coordinates the rotational movement of pulleys 46, 47 and the band saw 28. Suitable control means not shown are provided to vary the speed of motor 48 to provide preselected speeds for band saw 28 over a range of 350 feet per minute to 2,500 feet per minute. Band saw 28 is trained about pulleys 18, 46 and 47 as well as the guide surface 26 of tool support means 23 wherein the tool surface 26 is shaped to the contour of the tread portion of the tire as noted in FIG. 4. If desired to trim the side edges of the tire tread rather than the entire tread, the tool guide 25 may be contoured so that the respective side portions 25a are contoured to the shape of the tread while the center portion of the tool guide 25 between portions 25a maintains the band saw 28 out of contact with the tire to be trued. Pneumatic tire 38 has a center line depicted by line AB with the cutting edge or teeth 54 of the band saw 28 being closely adjacent to the tangential portion of the tire 38. Such cutting edge may be scalloped rather than serrated. Suitable means may be provided to adjust the movement of tool support means 23 laterally or transversely into the tire toward line AB as desired, with the handwheel 32 being provided to move the tool support means 23 vertically downward into operative position to provide a predetermined cut or radial distance on the pneumatic tire being trued. In lieu of lead screw 31 and handwheel 32 a pneumatic cylinder may be provided to move the tool support means vertically downward, which pneumatic cylinder would be in cooperative relationship with the energization of the cylinder 19 to facilitate the movement of such tool support means toward the work piece since the band saw 28 is a fixed length.

In the operation of the tire truing apparatus described the operator places a tire on the tire flange 37 and inflates the tire from a suitable pressure source via conduit 43 and passageway 41. Motors 39 and 48 are energized to rotate tire 38 and band saw 28. The operator then moves tool support means 23 via rotation of handwheel 32 into proper position which may be aided by suitable stop means located on the U-shaped member 12 in a manner well known and understood in the art. As the tire 38 is rotated past the rapidly orbiting band saw 28, the band saw is adapted to skive an extremely fine layer of approximately 0.001 to 0.002 of an inch or more off different portions of the tire, thus truing the tire to its radial dimension. Such skiving can be accomplished on the tread portions, feathering the skived portions. The apparatus rapidly performs the truing operation since the band saw is traveling at a high rate of speed as the tire is rotated. Such operation is performed in one complete revolution of the tire; however, if additional material is to be removed, additional passes may be made.

Various modifications are contemplated and may be resorted to by those skilled in the art without departing from the described invention as hereinafter defined by the appended claims as only preferred embodiments have been described.

I claim:

1. The method of truing a tire comprising the steps of rotating a chucked tire about its central axis of rotation, rotating an endless band saw in an orbital path; guiding a portion of said band saw in its rotation through arcuately shaped contour of a crown profile of a tire to selectively trim across the full face of said tire as it is rotated past said band saw.

2. The method of truing a tire comprising the steps of chucking a tire, inflating said tire to a toroidal shape, rotating said chucked tire about its central axis of rotation, and incrementally moving in a direction that is normal to a vertical plane passing through said central axis of said tire a portion of an endless band saw with an arcuately shaped contoured profile thereof across the full tread profile face of said rotated tire for removing out of round portions therefrom.

3. The method of truing a tire comprising the steps of chucking a tire, inflating said tire to a toroidal shape, rotating a chucked tire about its central axis of rotation, and incrementally moving in a direction that is normal to a vertical plane passing through said central axis of said tire a portion of an endless band saw in contact with a guide having an arcuately shaped contour that extends substantially across the full tread face of said chucked tire for guiding such portion of such saw into contact with the curved profile of a tire to remove the out of round portions therefrom to true the contoured profile thereof.

4. A tire truing machine comprising support means, chuck means mounted on said support means for supporting a tire for rotation about a central axis, motive drive means connected to said chuck means for rotating said chuck means and a tire mounted thereon about said central axis, a circular endless band saw mounted on said support means, drive means connected to said band saw for driving said band saw through an orbital path, tool support means mounted on said support means, said tool support means having an arcuately shaped recess whose curvature is concentric to the adjacent cross-sectional outer crown portion to a tire held by said chuck means and being operative to guide said band saw in a portion of its path to trim the outer peripheral surface of a tire as it is held and rotated by said chuck means.

5. A tire truing machine as set forth in claim 4 wherein said band saw has a scalloped cutting edge.

6. A tire truing machine as set forth in claim 4 wherein said tool support means includes a slide member moveable toward and away from said central axis, and means connected to said slide member for moving and positioning said tool support means and said saw blade for the truing operation.

7. A tire truing machine as set forth in claim 4 wherein said drive means moves said band saw at a selected range of speeds from 350 to 2,500 feet per minute.

8. A tire truing machine comprising support means, chuck means mounted on said support means for supporting a tire for rotation about a central axis, motive drive means connected to said chuck means for rotating said chuck means about said central axis, a circular endless band saw mounted on said support means, drive means connected to said band saw for driving said band saw through an orbital path, tool support means mounted on said support means, said tool support means having a tool guide portion operative to guide said band saw in a portion of its path to trim a tire as it is held and rotated by said chuck means, said tool support means includes a slide member linearly moveable toward and away from said central axis, means connected to said tool support means for moving and positioning said tool support means and said slide member, said slide member having a tool guide with an arcuately shaped recess therein for guiding said band saw therealong as it passes thereover, and said arcuately shaped recess is contoured to the shape of a tire tread cross-sectional profile.

9. A tire truing machine as set forth in claim 8 wherein said arcuately shaped recess has a central portion and a pair of spaced end portions, said pair of spaced end portions being contoured to the shape of the tire tread surface while said central portion is contoured to maintain said band saw out of contact with a tire held by said chuck means.

10. A tire truing machine as set forth in claim 8 wherein said support means has a plurality of rollers operative to guide said band saw in said endless orbital path and for passage onto said arcuately shaped recess of said tool guide.

11. A tire truing machine as set forth in claim 10 wherein biasing means are connected to certain of said rollers to maintain a tension thereon, and power means connected to said slide member for positioning said slide member and said tool guide portion toward and away from said central axis, and said last mentioned power means cooperative with said biasing means to maintain said band saw tensioned and in position on said plurality of rollers.

12. An apparatus for truing tires comprising a support means, chuck means mounted on said support means for supporting a tire, drive means operatively connected to said chuck means for rotating said chuck means and a tire mounted thereon about an axis of rotation, spaced pulley means mounted on said support means, an endless band saw mounted on said support means and trained about said spaced pulleys for movement thereon, said band saw having a forwardly disposed cutting edge, guide means mounted on said support means between said spaced pulley means, said guide means having an arcuately shaped recess, said recess defining a full profile of the desired crown of a tire, and said recess operative to guide the path of movement of said endless band saw in its movement between said spaced pulley means to position the cutting edge of band saw tangentially in line with the full cross-sectional profile of a tire mounted on said chuck means.

* * * * *